United States Patent
Mongillo, Jr. et al.

(10) Patent No.: US 9,228,442 B2
(45) Date of Patent: Jan. 5, 2016

(54) TURBINE AIRFOIL TIP SHELF AND SQUEALER POCKET COOLING

(75) Inventors: Dominic J. Mongillo, Jr., West Hartford, CT (US); Steven Bruce Gautschi, Naugatuck, CT (US); San Quach, East Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 639 days.

(21) Appl. No.: 13/440,297

(22) Filed: Apr. 5, 2012

(65) Prior Publication Data

US 2013/0266454 A1    Oct. 10, 2013

(51) Int. Cl.
*F01D 5/08*    (2006.01)
*F01D 5/20*    (2006.01)

(52) U.S. Cl.
CPC . *F01D 5/20* (2013.01); *Y02T 50/673* (2013.01)

(58) Field of Classification Search
CPC .......................................................... F01D 5/20
USPC .................... 415/173.6, 173.1, 173.5, 173.3; 416/97 R
See application file for complete search history.

(56) References Cited

U.S. PATENT DOCUMENTS

| | | | |
|---|---|---|---|
| 4,726,104 A | 2/1988 | Foster et al. | |
| 5,261,789 A * | 11/1993 | Butts et al. | 416/96 R |
| 5,476,364 A | 12/1995 | Kildea | |
| 5,688,107 A | 11/1997 | Downs et al. | |
| 6,050,777 A | 4/2000 | Tabbita et al. | |
| 6,059,530 A | 5/2000 | Lee | |
| 6,164,914 A | 12/2000 | Correia et al. | |
| 6,190,129 B1 * | 2/2001 | Mayer et al. | 416/97 R |
| 6,382,913 B1 * | 5/2002 | Lee et al. | 416/96 R |
| 6,422,821 B1 * | 7/2002 | Lee et al. | 416/224 |
| 6,554,575 B2 * | 4/2003 | Leeke et al. | 416/224 |
| 6,595,749 B2 | 7/2003 | Lee et al. | |
| 6,652,235 B1 * | 11/2003 | Keith et al. | 416/92 |
| 6,672,829 B1 * | 1/2004 | Cherry et al. | 415/115 |
| 6,790,005 B2 | 9/2004 | Lee et al. | |
| 6,929,054 B2 | 8/2005 | Beals et al. | |
| 6,991,430 B2 | 1/2006 | Stec et al. | |
| 7,118,342 B2 * | 10/2006 | Lee et al. | 416/97 R |
| 7,270,170 B2 | 9/2007 | Beals et al. | |
| 7,281,894 B2 | 10/2007 | Lee et al. | |
| 7,607,893 B2 | 10/2009 | Lee et al. | |
| 8,113,779 B1 | 2/2012 | Liang | |

(Continued)

OTHER PUBLICATIONS

International Searching Authority Patent Cooperation Treaty, Notification of Transmittal of the International Search Report and the Written Opinion, Sep. 26, 2013, 9 pages.

*Primary Examiner* — Dwayne J White
*Assistant Examiner* — Jason Fountain
(74) *Attorney, Agent, or Firm* — Kinney & Lange, P.A.

(57) ABSTRACT

An airfoil comprises leading and trailing edges with pressure and suction surfaces defining a chord length therebetween. The pressure and suction surfaces extend from a root section of the airfoil to a tip section. A tip shelf is formed along the tip section between the pressure surface and a tip shelf wall spaced between the pressure surface and the suction surface. A squealer pocket is formed along the tip section between the tip shelf wall and a squealer tip wall extending from the suction surface. The tip shelf extends from within 10% of the cord length measured from the leading edge to within 10% of the chord length measured from the trailing edge. The squealer pocket extends from within 10% of the chord length measured from the leading edge to terminate between 10% and 25% of the chord length measured from the trailing edge.

20 Claims, 5 Drawing Sheets

(56) References Cited

U.S. PATENT DOCUMENTS

| | | |
|---|---|---|
| 8,186,965 B2 * | 5/2012 | Kuhne et al. .................. 416/228 |
| 8,628,299 B2 * | 1/2014 | Ammann et al. ........... 416/97 R |
| 2002/0090301 A1 | 7/2002 | Lee et al. |
| 2006/0051209 A1 * | 3/2006 | Lee et al. .................... 416/97 R |
| 2008/0131278 A1 | 6/2008 | Correia et al. |
| 2008/0131285 A1 | 6/2008 | Albert et al. |
| 2010/0303625 A1 | 12/2010 | Kuhne et al. |
| 2012/0189427 A1 * | 7/2012 | Kwon et al. ...................... 415/1 |
| 2012/0282108 A1 * | 11/2012 | Lee et al. .................... 416/97 R |

\* cited by examiner

TURBINE AIRFOIL TIP SHELF AND SQUEALER POCKET COOLING

STATEMENT OF GOVERNMENT INTEREST

This invention was made with U.S. Government support under Contract No. N00019-02-C-3003 awarded by Department of the Air Force. The Federal Government has certain rights in this invention.

BACKGROUND

This invention relates generally to turbomachinery, and specifically to turbine rotor components. In particular, the invention concerns rotor blades for a gas turbine engine.

Gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

Gas turbine engines provide efficient, reliable power for a wide range of applications, including aviation and industrial power generation. Smaller-scale engines such as auxiliary power units typically utilize a one-spool design, with co-rotating compressor and turbine sections. Larger-scale jet engines and industrial gas turbines (IGTs) are generally arranged into a number of coaxially nested spools, which operate at different pressures and temperatures, and rotate at different speeds.

The individual compressor and turbine sections in each spool are subdivided into a number of stages, which are formed of alternating rows of rotor blade and stator vane airfoils. The airfoils are shaped to turn, accelerate and compress the working fluid flow, or to generate lift for conversion to rotational energy in the turbine.

Aviation applications include turbojet, turbofan, turboprop and turboshaft engines. In turbojet engines, thrust is generated primarily from the exhaust. Modern fixed-wing aircraft generally employ turbofan and turboprop designs, in which the low pressure spool is coupled to a propulsion fan or propeller. Turboshaft engines are typically used on rotary-wing aircraft, including helicopters.

Turbofan engines are commonly divided into high and low bypass configurations. High bypass turbofans generate thrust primarily from the fan, which drives airflow through a bypass duct oriented around the engine core. This design is common on commercial aircraft and military transports, where noise and fuel efficiency are primary concerns. Low bypass turbofans generate proportionally more thrust from the exhaust flow, providing greater specific thrust for use on high-performance aircraft, including supersonic jet fighters. Unducted (open rotor) turbofans and ducted propeller engines are also known, in a variety of counter-rotating and aft-mounted configurations.

Turbofan engine performance depends on precise control of the working fluid flow, including flow across the airfoil tip. Where clearance, abrasion and temperature effects are of concern, moreover, these factors often pose competing design demands on compressor and turbine rotor geometry, particularly in the tip region of the airfoil.

SUMMARY

This invention concerns an airfoil for a gas turbine engine, for example a rotor airfoil for a compressor or turbine. The airfoil extends axially from a leading edge to a trailing edge, defining pressure and suction surfaces therebetween. The pressure and suction surfaces extend radially from a root section of the airfoil to a tip section of the airfoil.

The tip section of the airfoil includes a squealer pocket and a tip shelf. The tip shelf extends along the tip section of the airfoil between the concave surface and a tip shelf wall, and the tip shelf wall is spaced between the pressure surface and the suction surface. The squealer pocket extends along the tip section of the airfoil between the tip shelf wall and a squealer tip wall, where the squealer tip wall extends along the suction surface.

The tip shelf extends from within 10% of the cord length measured from the leading edge to within 10% of the chord length measured from the trailing edge. The squealer pocket extends from within 10% of the chord length measured from the leading edge to terminate between 10% and 25% of the chord length measured from the trailing edge.

DETAILED DESCRIPTION

Figure 1:
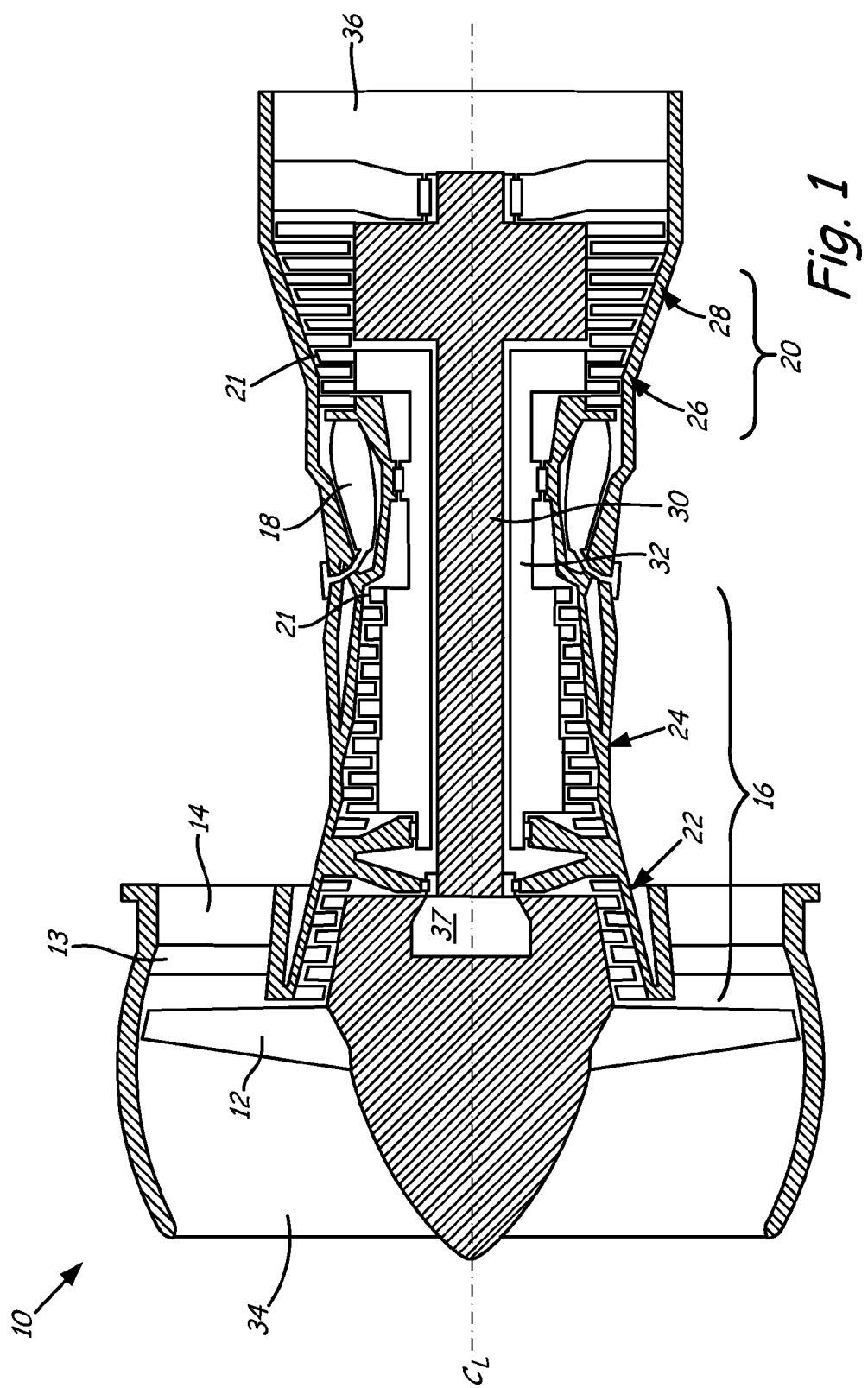
FIG. 1 is a cross-sectional view of a gas turbine engine.

FIG. 1 is a cross-sectional view of gas turbine engine 10, in a turbofan configuration. In this configuration, gas turbine engine 10 includes propulsion fan 12 mounted inside bypass duct 14. The power core is formed by compressor section 16, combustor 18 and turbine section 20. Rotor blades (or airfoils) 21 in at least one of compressor section 16 and turbine section 20 are provided with squealer tip and tip shelf feature, for improved performance and reliability as described below.

In the two-spool, high bypass configuration of FIG. 1, compressor section 16 includes low pressure compressor (LPC) 22 and high pressure compressor (HPC) 24. Turbine section 20 includes high pressure turbine (HPT) 26 and low pressure turbine (LPT) 28.

Low pressure compressor 22 is rotationally coupled to low pressure turbine 28 via low pressure (LP) shaft 30, forming the LP spool or low spool. High pressure compressor 24 is rotationally coupled to high pressure turbine 26 via high pressure (HP) shaft 32, forming the HP spool or high spool.

In operation of gas turbine engine 10, fan 12 accelerates air flow from inlet 34 through bypass duct 14, generating thrust. The core airflow is compressed in low pressure compressor 22 and high pressure compressor 24, then mixed with fuel in combustor 18 and ignited to generate combustion gas.

The combustion gas expands to drive high and low pressure turbines 26 and 28, which are rotationally coupled to high pressure compressor 24 and low pressure compressor 22, respectively. Expanded combustion gases exit through exhaust nozzle 36, which is shaped to generate additional thrust from the exhaust gas flow.

In advanced turbofan designs, low pressure shaft 30 is coupled to fan 12 via geared drive mechanism 37, providing improved fan speed control for increased efficiency and reduced engine noise. Propulsion fan 12 may also function as a first-stage compressor for gas turbine engine 10, with low pressure compressor 22 performing as an intermediate-stage compressor or booster. Alternatively, the low pressure compressor stages are absent, and air from fan 12 is provided directly to high pressure compressor 24, or to an independently rotating intermediate compressor spool.

Gas turbine engine 10 thus encompasses a range of different shaft and spool geometries, including one-spool, two-spool and three-spool configurations, in both co-rotating and counter-rotating designs. Gas turbine engine 10 may also be configured as a low bypass turbofan, an open-rotor turbofan, a ducted or unducted propeller engine, or an industrial gas turbine.

Figure 2:
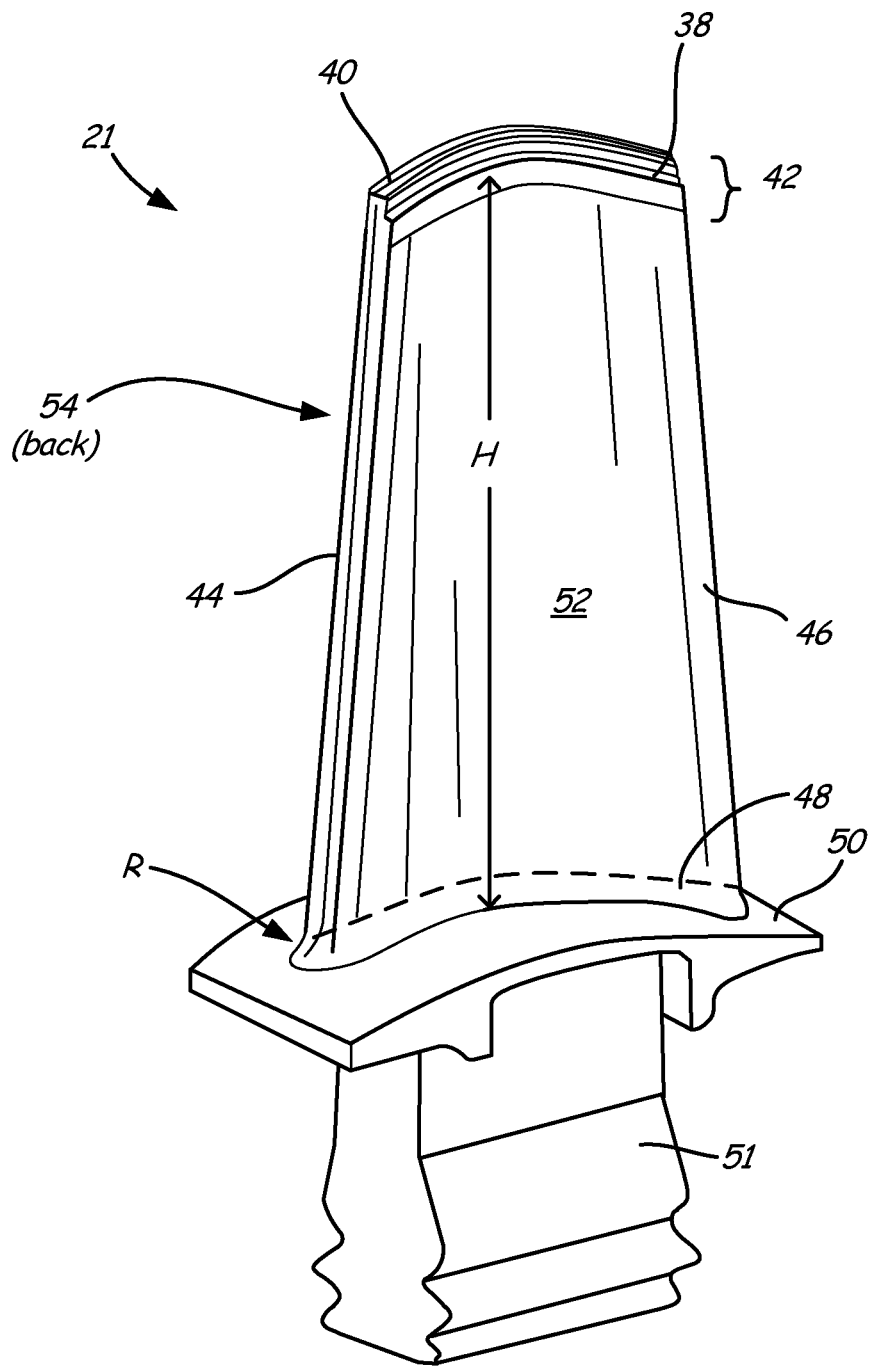
FIG. 2 is a perspective view of a rotor airfoil for the gas turbine engine, with a tip shelf and squealer pocket.

FIG. 2 is a perspective view of rotor airfoil 21 for gas turbine engine 10 of FIG. 1. Tip shelf 38 and squealer tip cavity 40 are formed in tip section 42 of airfoil 21, providing improved tip cooling and resistance to oxidation, erosion and burn-through.

As installed in the fan or compressor section of a gas turbine engine or other turbomachine, airfoil 21 extends axially from leading edge 44 to trailing edge 46, and radially from root section 48, adjacent inner diameter (ID platform 50, to tip section 42. Root section 48 typically has fillet radius R along leading edge 44, trailing edge 46 or both, forming a smooth aerodynamic and stress relief transition to platform 50 with attachment 51.

Pressure surface 52 (front) and suction surface 54 (back) extend axially from leading edge 44 to trailing edge 46, defining the profile of airfoil 21 therebetween. Pressure (concave) surface 52 and suction (convex) surface 54 extend radially from root section 48 and platform 50 to tip section 42, defining span height H of airfoil 21.

Tip shelf 38 forms an open radial recess along tip section 42 of airfoil 21, extending axially from leading edge 44 to trailing edge 46 along pressure surface 52. Squealer pocket 40 forms a closed radial recess in tip section 42 of airfoil 21, extending axially from leading edge 44 to trailing edge 46, between pressure surface 52 and suction surface 54.

When airfoil 21 is exposed to high temperature flow, for example in the turbine and high pressure compressor sections of a low-bypass turbofan for military applications, tip section 42 experiences oxidation, erosion, burn-through and other high temperature effects. To address this problem, tip section 42 of airfoil 21 is formed with a combined tip shelf and squealer pocket structure, with tip shelf 38 extending along pressure surface 52, adjacent squealer tip cavity 40 between tip shelf 38 and suction surface 54.

Squealer tip cavity (or squealer pocket) 40 maintains a region or pocket of cooling fluid (e.g., air) along tip section 42 of airfoil 21, between pressure surface 52 and suction surface 54. Tip shelf 38 maintains a region or pocket of cooling fluid along pressure surface 52, between leading edge 44 and trailing edge 46 in tip section 42. The pockets of cooling fluid provide a more uniform cooling temperature along tip section 42, for better oxidation resistance, reduced erosion and less burn-through.

Figure 3:
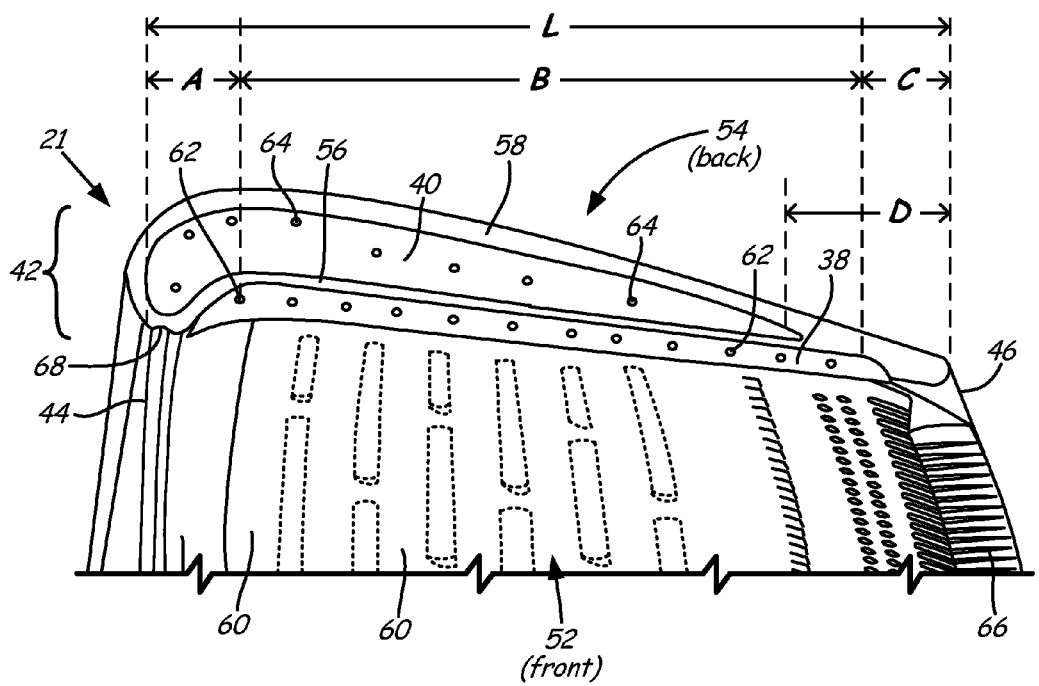
FIG. 3 is perspective view of the tip section of the airfoil, showing the tip shelf and squealer pocket.

FIG. 3 is perspective view showing tip section 42 of airfoil 21. Tip shelf 38 extends adjacent pressure surface 52 (front) of airfoil 21, from leading edge 44 to trailing edge 46 along tip section 42. Squealer tip cavity 40 extends between tip shelf 38 and suction surface 54 (back) of airfoil 21, from leading edge 44 toward trailing edge 46.

As shown in FIG. 3, tip shelf 38 defines an open (or discontinuous) perimeter radial recess in tip section 42 of airfoil 21. That is, the tip shelf recess is open along pressure surface 52, extending axially from leading edge 44 to trailing edge 46, with tip shelf 38 defined between pressure surface 52 and vertical wall 56.

Vertical (tip shelf) wall 56 extends radially or vertically upward from tip shelf 38, as shown in FIG. 3, adjacent squealer tip cavity 40. Tip shelf wall 56 also extends axially along tip section 42, from leading edge 44 to trailing edge 46. Tip shelf wall 56 is thus defined between tip shelf 38 and squealer tip cavity 40, spaced from pressure surface 52 by tip shelf 38, and spaced from suction surface 54 by squealer tip cavity 40.

Tip shelf wall 56 defines a discontinuous or open perimeter cavity for tip shelf 38, extending more than 90% of chord length L between leading edge 44 and trailing edge 46 of airfoil 21 at tip section 42, or more than 95% of the chord length. In particular, tip shelf 38 extends along tip section 42 of airfoil 21 for substantially all of chord length L, including leading edge region A, within 5-10% of chord length L from leading edge 44, midchord region B, between 5-10% and 90-95% of chord length L, and trailing edge region C, within 5-10% of chord length L from trailing edge 46.

In this configuration, tip shelf 38 extends substantially all of the way along pressure surface 52 to trailing edge 46, for example within 2% or 5% of chord length L of trailing edge 46, in order to prevent localized oxidation in this region. Similarly, tip shelf 38 extends substantially all of the way along pressure surface 52 to leading edge 44, for example within 2% or 5% of chord length L of leading edge 44, in order to prevent localized oxidation in that region.

Squealer tip cavity 40 defines a continuous perimeter (or closed perimeter) radial recess in tip section 42 of airfoil 21, between tip shelf wall 56 and squealer tip wall 58. Squealer tip wall 58 extends axially along suction surface 54 of airfoil 21 at tip section 42, from leading edge 44 to trailing edge 46.

Squealer tip wall 58 is coextensive with suction surface 54, and spaced from tip shelf wall 56 by squealer tip cavity 40 in midchord region B. Tip shelf wall 56 and squealer tip wall 58 meet in leading edge region A, along leading edge 44, and in trailing edge region C, along trailing edge 46.

First (tip shelf) and second (squealer tip) walls 56 and 58 define a continuous or closed perimeter cavity for squealer tip cavity 40, where cavity 40 extends for more than 75% of chord length L, but less than 90% of chord length L. In particular, squealer tip cavity 40 extends along tip section 42 of airfoil 21 through midchord region B to leading edge region A, within 5-10% of chord length L from leading edge 44. Squealer tip cavity 40 also extends along through midchord region B to terminate in aft region D, at least 10-25% of chord length L from trailing edge 44.

Squealer tip cavity 40 does not extend into trailing edge region C, within 5-10% of chord length L from trailing edge 44. Thus, tip shelf 38 is longer than squealer tip cavity 40 along chord L. This configuration decreases tip leakage over substantially the entire length of airfoil 21 along tip section 42, improving rotor stage efficiency by reducing the tip loss penalty.

Airfoil 21 also includes internal cooling channels 60. Internal cooling channels 60 provide cooling fluid (air) flow to tip shelf 38 via tip shelf cooling holes 62, and to squealer tip cavity 40 via squealer tip cooling holes 64. In some designs, internal cooling channels 60 also provide additional cooling flow, for example to trailing edge cooling holes or cooling slots 66 along trailing edge 46. In additional designs, leading edge 44 is provided with additional structure, such as leading edge indentation 68 to improve heat transfer and flow properties along the stagnation region.

Tip shelf cooling holes 62 maintain a pocket or region of cooling fluid in tip shelf recess 38, extending between tip shelf wall 56 and pressure surface 52 of airfoil 21, from leading edge 44 to trailing edge 46 along tip section 42. Squealer tip cooling holes 64 maintain a pocket or region of cooling fluid in squealer tip recess 40, extending between tip shelf wall 56 and squealer tip wall 58, from leading edge 44 toward trailing edge 46 along tip section 42. In addition, tip shelf wall 56 forms a lip of metal between tip shelf 38 and squealer tip cavity 40, increasing heat loss and reducing leakage across tip section 42 of airfoil 21.

The combination of tip shelf 38 and squealer tip cavity 40 also reduces the heat transfer coefficient across tip section 42, which reduces the net heat flux into airfoil tip region 42, improving the performance and service life of airfoil 21. In particular, the heat transfer coefficient may be substantially proportional to the Reynold's Number, which in turn may be substantially proportional to the mass flow. The structure of tip shelf 38 and squealer tip cavity 40 reduces mass flow, so the heat transfer coefficient goes down in airfoil tip 42. That is, there is less heat transfer from the hot gas (working fluid) into airfoil tip section 42, resulting in decreases thermal effects and improved service life for airfoil 21.

Additionally, transient thermal strains are reduced due to the removal of hot metal volume with the incorporation of squealer pocket 40. Conventional airfoil tip designs that do not incorporate a squealer pocket have significant hot metal volume locally in the tip region. During transient operation of the gas turbine engine, there is interaction between the airfoil blade tip surface and the blade outer airseal (BOAS). As a result of this rub/friction interaction, heat is generated along the tip airfoil surface due to the frictional interaction, and blade airfoil tip metal temperatures become hotter.

Interaction of the blade tip and blade outer airseal is desirable in that it ensures minimum (or lower) tip clearance during engine operation. Reductions in tip clearance minimize (or reduce) leakage flow over the blade tip region, with lower losses and increased turbine efficiency. The interaction, however, does not come without penalty to airfoil blade tip cooling performance, impacting durability.

Due to the cyclic nature of gas turbine operations, transient thermal response rates of the airfoil metal are relevant to mitigating compressive (or thermal) strains. Thermal strains result from differences in the relative transient response rates of local metal temperatures, including the tip region of the airfoil, which historically has significant hot metal mass that transiently responds at a different (or slower) rate than the surrounding pressure and suction side walls.

As a result of the difference in relative cooling and heating rates, compressive (or thermal) strain is induced in the airfoil tip region during transient operation. In other designs, without the improvements described here, the cyclic nature of gas turbine engine operations, combined with locally high strain, may result in the initiation and propagation of thermal mechanical fatigue (TMF) cracking.

To alleviate compressive (or thermal) strains it is desirable to more closely match the transient response rates of tip section 42 of airfoil 21 with the local airfoil walls 52 and 54. Removing (in operation, hot) metal volume with the incorporation of squealer pocket 40 enables the transient response of airfoil tip region 42 and airfoil walls 52 and 54 to be more closely matched, eliminating (or reducing) a propensity to initiate and propagate TMF cracks (e.g., through-wall TMF cracks) in airfoil tip region 42, improving durability and performance of airfoil 21 in tip region 42 and reducing premature oxidation erosion distress, which effects could otherwise increase airfoil tip clearance and tip leakage flow. The net effect of these improvements to airfoil 21 is an improvement in turbine efficiency and overall engine performance, which positively impacts fuel burn and engine on-wing time and service life performance.

Figure 4:
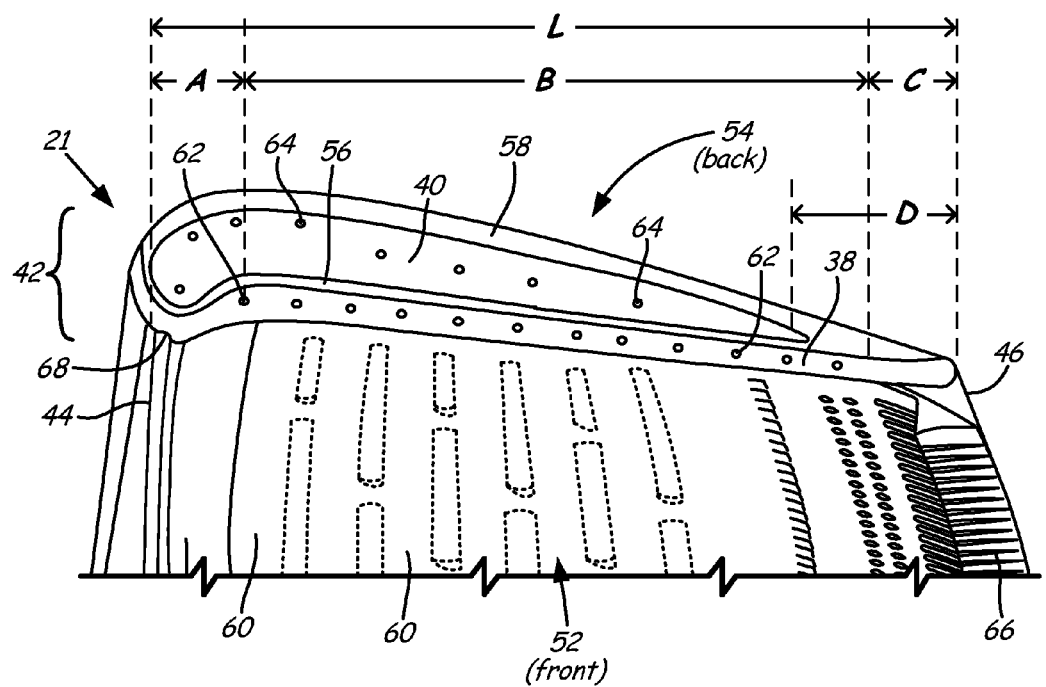
FIG. 4 is a perspective view of the tip section of the airfoil, showing another configuration for the tip shelf.

FIG. 4 is a perspective view showing tip section 42 of airfoil 21. Tip shelf 38 extends adjacent pressure surface 52 (front) of airfoil 21, as described above, from leading edge 44 to trailing edge 46 along tip section 42. Squealer tip cavity 40 extends between tip shelf 38 and suction surface 54 (back) of airfoil 21, from leading edge 44 toward trailing edge 46.

In this configuration, the length of tip shelf (or trench) 38 is extended through region A to wrap tip shelf 38 around leading edge surface 44, extending tip shelf 38 onto suction surface (or suction side) 54 of airfoil 21 in tip section 42. In addition, the length of tip shelf 38 is extended along pressure surface 52 so that tip shelf 38 extends through region C to extreme trailing edge surface 46, terminating approximately at the downstream intersection of pressure surface 52 and suction surface 54.

This example, however, is merely representative. In other designs, tip shelf 38 wraps around leading edge 44 and extends onto suction surface 54, but tip shelf 38 does not extend to trailing edge 46. Instead, tip shelf 38 terminates at a location upstream of trailing edge 46 along pressure surface 52, as described above.

Alternatively, tip shelf 38 extends to extreme trailing edge surface 46, terminating approximately at the downstream intersection between pressure surface 52 and suction surface 54, but tip shelf 38 does not wrap around leading edge 44. Instead, tip shelf 38 terminates at extreme leading edge surface 44, or approximately the upstream intersection of pressure surface 52 and suction surface 54, or tip shelf 38 terminates at a location downstream of leading edge 44 along pressure surface 52, as described above.

Figure 5A:
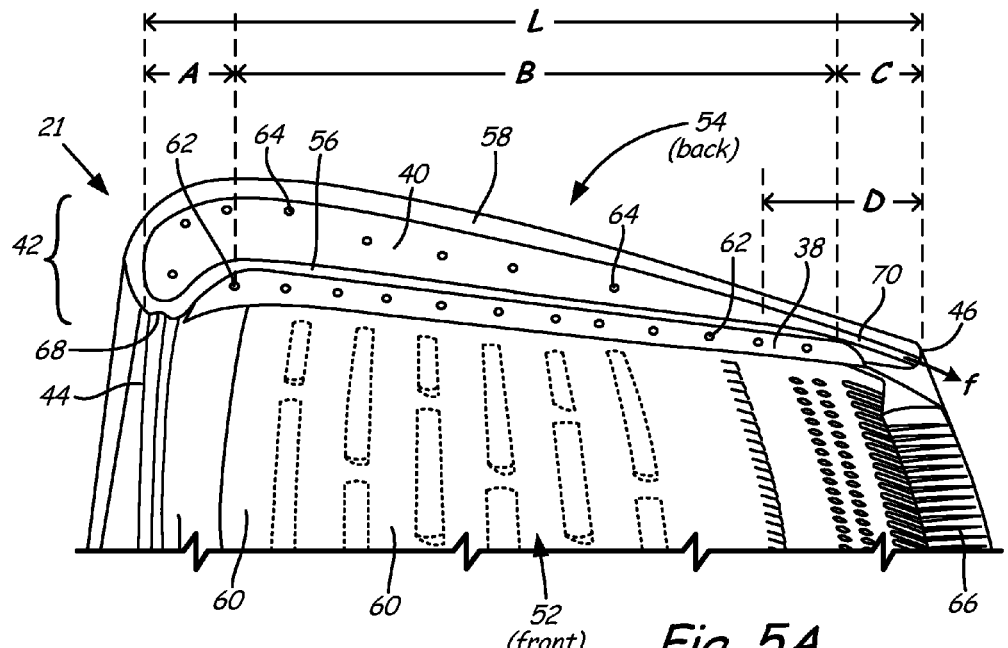
FIG. 5A is a perspective view of the tip section of the airfoil, showing the squealer pocket with a squealer discharge flow channel configuration.

FIG. 5A is a perspective view showing tip section 42 of airfoil 21, with squealer discharge flow channel 70 extending from squealer tip cavity (or squealer pocket) 40 to trailing edge 46. In this configuration, tip shelf 38 terminates at a location upstream from trailing edge 46, spaced from squealer discharge flow channel 70.

Squealer discharge flow channel 70 extends from squealer tip cavity 40 to the downstream intersection of pressure surface 52 and suction surface 54, at extreme trailing edge surface 46. Squealer discharge flow channel 70 is configured to reduce the magnitude of vortex flow in tip leakage flow f by axially aligning squealer discharge flow channel 70 at trailing edge 46 and reducing penetration of leakage flow over blade tip 42 by discharging a portion of the coolant flow from tip shelf 34 and squealer pocket 40 in a predominately axial direction aligned with suction side 54 streamlines adjacent tip section 42 and trailing edge 46, which streamlines are predominately axial in nature. This alignment of flow f from squealer pocket 40 at trailing edge 46 reduces the magnitude and strength of the tip leakage vortex (or tip leakage vortexs flow), improving efficiency, performance and durability.

Figure 5B:
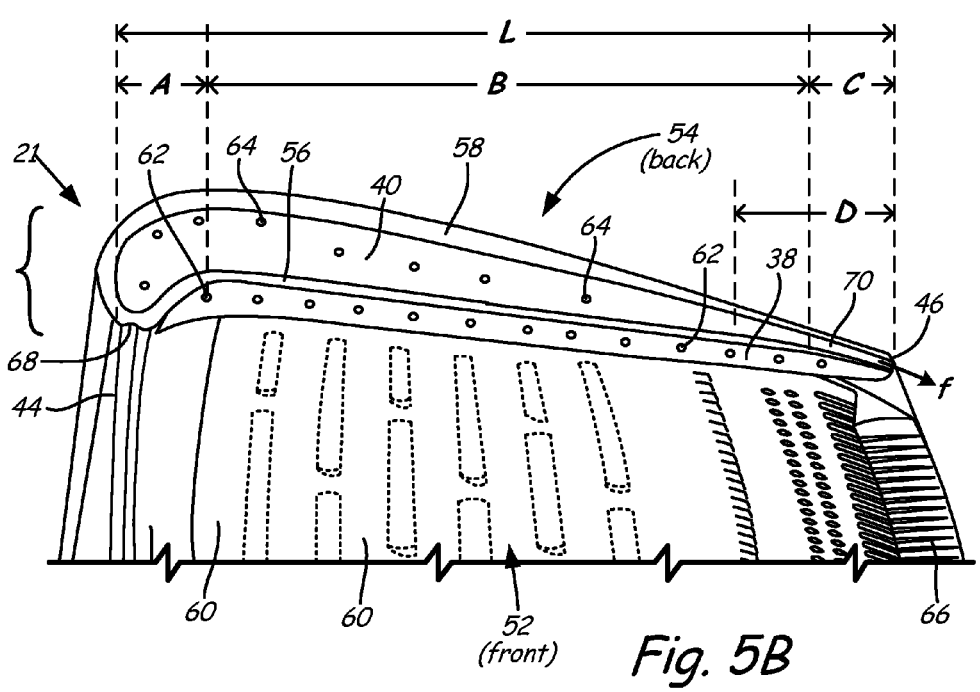
FIG. 5B is a perspective view of the tip section of the airfoil, showing the squealer pocket with an alternate squealer discharge flow channel configuration.

FIG. 5B is a perspective view showing tip section 42 of airfoil 21, with squealer discharge flow channel 70 extending from squealer tip cavity (or squealer pocket) 40 to trailing edge 46. In this configuration, tip shelf 38 extends through region C to extreme trailing edge surface 46, terminating approximately at the downstream intersection of pressure surface 52 and suction surface 54. That is, in this configuration tip shelf 38 terminates approximately at the location of squealer discharge flow channel 70.

In some designs, cooling fluid flow from tip shelf 38 and squealer discharge flow channel 70 merge at or upstream of extreme trailing edge surface 46. In these designs, squealer discharge flow channel 70 discharges a portion of the cooling fluid flow from tip shelf 38 and squealer pocket 40, so that tip discharge flow f include contributions of cooling fluid flow from tip shelf 38 and squealer pocket 40.

While this invention has been described with reference to exemplary embodiments, it will be understood by those skilled in the art that various changes may be made and equivalents may be substituted for elements thereof without departing from the spirit and scope of the invention. In addition, modifications may be made to adapt a particular situation or material to the teachings of the invention, without departing from the essential scope thereof. Therefore, the invention is not limited to the particular embodiments disclosed herein, but includes all embodiments falling within the scope of the appended claims.

The invention claimed is:

1. An airfoil comprising:
   a leading edge, a trailing edge and pressure and suction surfaces defining a chord length therebetween, the pressure and suction surfaces extending from a root section of the airfoil to a tip section of the airfoil;
   a tip shelf formed along the tip section of the airfoil between the pressure surface and a tip shelf wall spaced between the pressure surface and the suction surface, wherein the tip shelf extends from the leading edge to an intersection of the pressure surface and the suction surface at the trailing edge such that the tip shelf communicates with both the pressure surface and the suction surface proximate to the trailing edge,
   wherein the tip shelf extends around the leading edge and onto the suction surface to terminate on the suction surface between the leading edge and the trailing edge of the airfoil; and
   a squealer pocket formed along the tip section of the airfoil between the tip shelf wall and a squealer tip wall extending from the suction surface, wherein the squealer pocket extends from within 10% of the chord length measured from the leading edge to terminate within 10% and 25% of the chord length measured from the trailing edge.

2. The airfoil of claim 1, wherein the squealer pocket extends for more than 75% of the chord length and less than 90% of the chord length.

3. The airfoil of claim 2, wherein the squealer pocket extends from a location within 5% of the chord length measured from the leading edge of the airfoil.

4. The airfoil of claim 1, further comprising a squealer discharge flow channel extending from the squealer pocket to the trailing edge of the airfoil.

5. The airfoil of claim 1, further comprising a plurality of cooling holes formed in the tip shelf to generate cooling fluid flow along pressure surface of the airfoil.

6. The airfoil of claim 5, further comprising a plurality of cooling holes formed in the squealer pocket to generate cooling fluid flow along the tip section of the airfoil.

7. A turbine engine comprising the airfoil of claim 1.

8. The turbine engine of claim 7, wherein the squealer pocket and tip shelf are configured to match transient response rates of the tip section with the pressure and suction surfaces adjacent the tip section based on removal of metal volume from the tip section of the airfoil, reducing transient thermal strains as compared to an airfoil without the squealer pocket and tip shelf.

9. A gas turbine engine blade comprising:
   an airfoil comprising suction and pressure surfaces extending from a root section to a tip section and from a leading edge to a trailing edge, the leading and trailing edges defining a chord length therebetween;
   a tip shelf defining an open perimeter recess between the pressure surface and a tip shelf wall spaced between the suction surface and the pressure surface, wherein the open perimeter recess extends from the leading edge of the airfoil the trailing edge of the airfoil,
   wherein the tip shelf extends to an intersection of the pressure surface and the suction surface at the trailing edge such that the tip shelf communicates with both the pressure surface and the suction surface proximate to the trailing edge, and
   wherein the tip shelf extends around the leading edge and onto the suction surface to terminate on the suction surface between the leading edge and the trailing edge of the airfoil; and
   a squealer pocket defining a closed perimeter recess between the tip shelf wall and a squealer tip wall extending congruently from the suction surface, wherein the closed perimeter recess extends from a region within 5% of the chord length measured from the leading edge of the airfoil to terminate in a region between 10% and 25% of the chord length measured from the trailing edge of the airfoil.

10. The blade of claim 9, wherein the closed perimeter recess defined by the squealer pocket extends along the tip section of the airfoil for more than 75% of the chord length and less than 90% of the chord length.

11. The blade of claim 9, further comprising a plurality of cooling holes formed in the tip shelf to maintain a pocket of cooling fluid along the tip section of the airfoil between the tip shelf wall and the pressure surface.

12. The blade of claim 11, further comprising a plurality of cooling holes formed in the squealer pocket to maintain a pocket of cooling fluid along the tip section of the airfoil between the tip shelf wall and the squealer tip wall.

13. An airfoil for a gas turbine engine, the airfoil comprising:
   leading and trailing edges extending from a root section to a tip section;
   pressure and suction surfaces defining a chord length between the leading and trailing edges;
   a squealer tip cavity extending along the tip section of the airfoil, the squealer tip cavity defined between a squealer tip wall extending congruently from the suction surface and a tip shelf wall extending between the squealer tip wall and the pressure surface, wherein the squealer tip cavity extends from a location within 10% of the chord length measured from the leading edge of the airfoil and terminates in a region between 10% and 25% of the chord length measured from the trailing edge of the airfoil; and
   a tip shelf recess formed between the tip shelf wall and the pressure surface of the airfoil, the tip shelf recess extending from the leading edge of the airfoil,
   wherein the tip shelf extends to the trailing edge of the airfoil to terminate at a downstream intersection of the pressure and suction surfaces such that the tip shelf communicates with both the pressure surface and the suction surface proximate to the trailing edge, and
   wherein the tip shelf extends around the leading edge and onto the suction surface to terminate on the suction surface between the leading edge and the trailing edge of the airfoil.

14. The airfoil of claim 13, further comprising a plurality of cooling holes formed along the squealer tip cavity and a plurality of cooling holes formed along the tip shelf recess.

15. The airfoil of claim 13, further comprising a squealer discharge flow channel extending from the squealer tip cavity to the trailing edge of the airfoil.

16. A rotor blade comprising the airfoil of claim 15.

17. A gas turbine engine comprising the rotor blade of claim 16.

18. The gas turbine engine of claim 17, wherein the squealer discharge flow channel is configured to reduce tip leakage vortex flow by axially aligning squealer discharge flow at the trailing edge of the airfoil.

19. The gas turbine engine of claim 17, wherein cooling fluid flow from the tip shelf and squealer pocket merge at the discharge flow channel.

20. The gas turbine engine of claim 19, wherein the squealer discharge channel is configured to reduce penetration of leakage flow over the blade tip by discharging cooling fluid flow from the tip shelf and the squealer pocket in an axial direction aligned with suction side streamlines adjacent the tip section of the airfoil at the trailing edge.

\* \* \* \* \*